Figure 2:
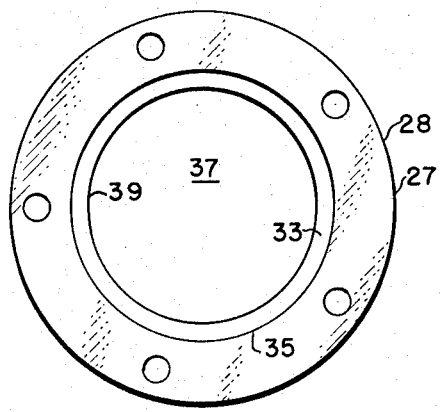

Sept. 29, 1964   R. G. D'ASCOLI ETAL   3,151,209
POTHEAD AND CABLE ENTRANCE SEAL
Filed Nov. 7, 1961

INVENTORS
RALPH G. D'ASCOLI
JOSEPH B O'MARA
BY
U F Volls
THEIR AGENT

United States Patent Office 3,151,209
Patented Sept. 29, 1964

3,151,209
POTHEAD AND CABLE ENTRANCE SEAL
Ralph G. D'Ascoli, Yonkers, and Joseph B. O'Mara,
Hastings on Hudson, N.Y., assignors, by mesne assignments, to Anaconda Wire and Cable Company, a corporation of Delaware
Filed Nov. 7, 1961, Ser. No. 150,755
4 Claims. (Cl. 174—19)

Our invention relates to potheads for electric cables and to means for sealing such potheads, particularly our invention relates to solderless seals between pothead entrances and cable sheaths and to compounds used in making such seals.

It has long been known to terminate high voltage electric cables by means of a casing, or pothead, usually in the form of a chamber filled with dielectric compound such as asphalt. Within this chamber the insulation of an electric cable is stripped down to bare the cable conductor for connection to such other apparatus as may be desired. At the point where the cable enters the pothead it is fully sheathed and it is necessary to seal the sheath to the casing to prevent leakage from the pothead of the dielectric fluid contained therein. Up until recent years the sheaths of almost all high-voltage cables were made of lead and it was possible to make a solder wipe between a metallic element of the pothead structure and the lead sheath of the cable. At present, however, there is an increasing use of neoprene and plastic sheathing for high voltage cables and the provision of a good and durable seal between the walls of the pothead and the unsolderable cable sheath has presented a problem that had not been satisfactorily solved prior to our invention. To properly understand the nature of this problem it should be realized that potheads are commonly installed out of doors, unattended, and are expected to render trouble-free service for many years through all kinds of weather. Furthermore the asphalts and insulating oils employed as insulation within pothead housings have a solvent effect on many materials that might otherwise be used as stuffing box sealants. It is an added problem that in addition to the temperature changes due to an outdoor environment the cables which require to be sealed to the potheads change temperature as a result of the electrical loads carried by their conductors and are subject to cyclic expansion and contraction which make it difficult to hold a seal. Furthermore each size of pothead is expected to fit a wide range of cable sizes and a cable of a given nominal size may be expected to vary within wide tolerances along its length so that a fit will depend on the precise point, not known in advance, where the cable will enter the pothead. Cost is an important factor and it is not practical to provide a large stock of pothead accessories for the purpose of accommodating different cable sizes.

The present invention has as its object an inexpensive, thoroughly reliable, solderless pothead connection that will fit a wide range of cable sizes without special accessories.

It provides a pothead comprising a chamber with a dielectric compound within the chamber, a first plate in fluid-tight engagement with the chamber and a second plate in registration with the first plate. The first plate has a central hole that constitutes an entrance to the pothead chamber and the second plate has a similar hole. There is a recess around the hole in the outer surface of the first plate and a matching recess in the inner surface of the second plate. A cable is enclosed by the entrances and our invention includes a sealing gasket comprised of a flat sheet that surrounds the cable and fills the recesses in the plates. There are means for pressing the plates together thereby compressing the gasket and extruding it into the annular space between the cable jacket and the plates to form a seal between the cable and the plates. Preferably the gasket will be comprised of an uncured polychloroprene compound and we have invented such a compound comprising:

| | Parts by weight |
|---|---|
| Uncured polychloroprene | 100 |
| Magnesia | 0–5 |
| Carbon black | 10–35 |
| Retarder | .25–1.5 |
| Processing aids | .5–3 | and more preferably comprising approximately

| | Parts by weight |
|---|---|
| Uncured polychloroprene WB | 100 |
| Magnesia | 1.5 |
| Antioxidant | .6 |
| Carbon black, MT | 22 |
| Paraffin | .6 |
| Wax | .6 |
| Light process oil | 2.5 |
| Retarder | .5 |

A more thorough understanding of our invention can be gained from a study of the appended drawing.

Figure 3:
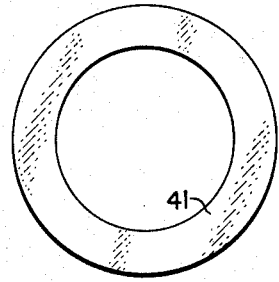
Figure 5:
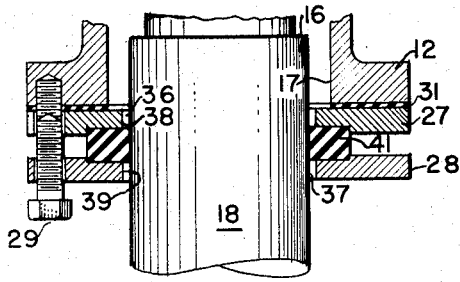
Figure 1:
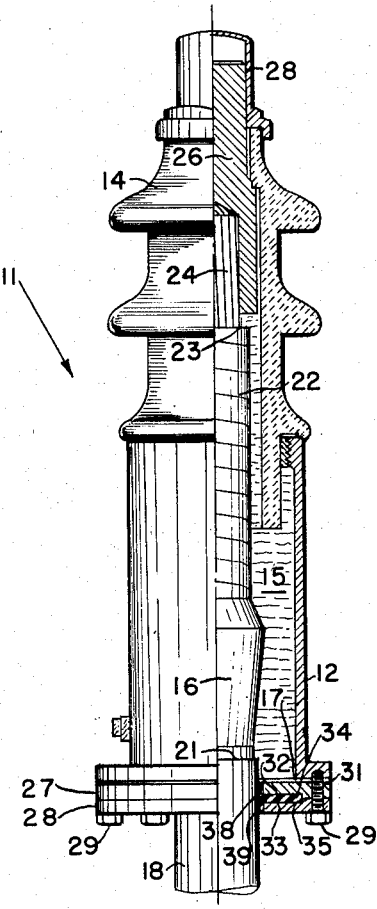
Figure 4:
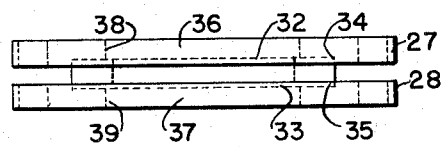
Figure 6:
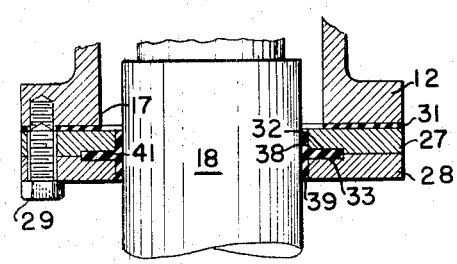

In the drawing:
FIGURE 1 is an elevation, partly in sections of a pothead embodying our invention.
FIGURE 2 is a plan view of a plate used in our invention.
FIGURE 3 is a plan view of a gasket made to our invention.
FIGURE 4 is a side view of the plate and gasket of FIGURES 2 and 3.
FIGURE 5 is an enlarged view of a pothead entrance prior to sealing.
FIGURE 6 is an enlarged view of the entrance of FIGURE 5 after sealing.

Referring to FIGURE 1 a pothead designated generally by the numeral 11 has a bell 12 and insulator 14 which together constitute a chamber for the containment of an insulating fluid 15. A cable 16 enters the chamber of the pothead 11 through an entrance throat 17 to be immersed in the fluid 15. The cable 16 has a jacket 18 which has been cut away at a point 21 inside of the pothead. Insulation 22 of the cable has also been removed at 23 to expose a metallic conductor 24 which is soldered to a metallic stem 26 for the purpose of making contact to an electrical apparatus not shown. The bell 12 is normally made of a metal such as a bronze casting which is maintained at ground potential. Adequate insulation is therefore required at all times between the conductor 24 and the bell 12 and this insulation is supplied largely by the compound 15. It is therefore imperative that no leakage of compound should occur through the throat 17. In the normal assembly of a termination the cable 16 is fitted into the pothead 11 and the conductor 24 connected to the stem 26 before the compound 15 is introduced. The compound is then heated and poured into the pothead in a molten fluid state. At room temperature the compounds most commonly used for pothead fillers are fairly stiff or viscous but they cannot become too rigid or solidify too hard without creating the danger of voids and channels. Particularly it is necessary that the compound be in continuous contact with all internal surfaces of the pothead and preferably that it wet these surfaces. As a consequence the most effective compounds have some liquid component at room temperature and, of course, at the higher temperatures that may be caused by direct sunshine, cable overloads, etc. viscosity of the compound may always be reduced to a point where it will flow through the throat 17 of the pothead 11 if it is not permanently sealed in. This tendency of the compound to flow through the throat of the pothead is, of course, greatly augmented by pressures created within the chamber with the increases in temperature.

Where the jacket 18 of the cable 16 has been made of lead it was the common practice to form a solder wipe between the lead jacket or sheath and the bell 12 or a metallic extension thereof before filling the pothead with compound. This is a skilled, time-consuming, expensive operation and in addition it is inapplicable for neoprene, plastic jacketed, or other cables that cannot be soldered. It has already been stated that the bell 12 is commonly a bronze casting and as such it is relatively expensive and cannot be economically stocked in more than a limited number of sizes of openings of the throat 17. To adapt the bell 12 to different cable sizes it has been known to bolt tapered wiping sleeves at the entrance throat. In the pothead of our invention two plates 27, 28 are bolted to the bell 12 by means of screws 29 and a gasket 31 of conventional design forms a seal between the plate 27 and the bell 12. The plates 27, 28 have respective recesses 32, 33 with shoulders 34, 35 and central holes 36, 37 respectively defined by internal cylindrical surfaces 38, 39.

The plates 27, 28 are in registration so that the holes 36, 37 provide a single passageway for the cable 16 and the walls 38, 39 are parallel to the surface of the jacket 18.

Referring now to FIGURES 3, 4 and 5 a gasket of our invention is dimensioned to fit snugly into the recesses 32, 33 of the plates 27, 28. The thickness of the gasket 41 exceeds the combined depths of the recesses 32, 33 so that when the plates 27, 28 are pressed together the excess material of the gasket will be extruded inwardly and when the cable 16 is inserted in the holes 38, 39 the extruded material will press against the cable jacket and form a seal therewith. The gasket 41 is preferably comprised of an uncured neoprene stock as will hereinafter be more fully described and it is easily cut to form a tight fit around the jacket 18 of the cable 16. It is thus seen that each size of the bell 12 can be made to accommodate a wide range of sizes of cable 16 for each bell size can accommodate the plates 27, 28 with a range of hole sizes and each hole size will in turn, accommodate a range of cable sizes. To fit a cable to a pothead a plate-gasket assembly such as that shown in FIGURE 4 is slid over the cut end of the cable and pushed up onto the jacket. The necessary internal connections are made and the closure is then positioned to have the configuration of FIGURE 5 prior to tightening the screws 29. When the screws 29 are tightened the gasket 41 is extruded inwardly as shown in FIGURE 6 to fill the space between the walls 38 and 39 and the jacket 18. It is a surprising feature of our invention that when the plates 27, 28 are pressed together a negligible portion, if any, of the gasket 41 extrudes outwardly to come between the plates 27, 28 and the overwhelming bulk of the excess material extrudes inwardly where it serves to seal the entrance to the pothead. This is particularly surprising since the recesses 32, 33 are shallow compared to the thickness of the unrestrained portion of the gasket, a typical recess being 1/16 inch deep for a gasket 1/4 inch in thickness. It should be noted that the utility of our seal is enhanced by the fact that there are no collars or other restraints against the flow of the gasket material between the jacket 18 and the walls 38, 39 so that if, because of a large cable diameter, the annular space is reduced in volume excess material is free to flow harmlessly along the length of the jacket beyond the confines of the plates.

We have invented a compound for the manufacture of the gaskets 41 which will extrude inwardly when the plates 27, 28 are drawn together but will not extrude substantially outwardly between the plates. Our compound will thus fill the annular space between the cable jacket and the walls 38, 39 and it will retain its sealing ability for many years thereafter. Our compound is an uncured elastomer compound preferably a compound of neoprene (polychloroprene) and most preferably a compound of unvulcanized neoprene type WB which is a low-verve polymer. To 100 parts (all by weight) of neoprene polymer we added 0–5 parts magnesia, 10–15 parts carbon black, .25–1.5 parts retarder and .5–3 parts of processing aids or more preferably we add 1–2 parts magnesia, .5–.75 part of an antioxidant, 15–28 parts of MT carbon black, .7–.75 part of paraffin, .5–.75 part of sun check wax, 2–3 parts of light process oil and .25–.75 part of retarder.

*Example*

A compound was prepared by milling together

| | Parts by weight |
|---|---|
| Polychloroprene polymer, type WB | 100 |
| Magnesia | 1.5 |
| Agerite resin | .6 |
| Carbon black, MT | 22 |
| Paraffin | .6 |
| Sun check wax | .6 |
| Light process oil | 2.5 |
| Retarder W (Du Pont) | .5 |

From the compound of the example a 1/4 inch thick sheet was formed and discs 1/2 inch in diameter were die cut from this sheet. The purpose of this test was to determine whether or not the compound would retain the required degree of plasticity after aging for various lengths of time. To simulate aging the specimens were placed in a 70° C. oven for the periods indicated in the first column of Table I. They were then conditioned at 40° C. and while still at 40° C. were compressed under a 5000 g. load for 15 seconds and then for 5 minutes. The amount of compression that occurred during the 5 minute interval is tabulated in the second column of Table I.

*Table I*

| Days aging at 70° C.: | Compression, inches |
|---|---|
| 0 | .0230 |
| 1 | .0205 |
| 3 | .02025 |
| 5 | .01825 |
| 7 | .0175 |
| 3 months' aging at room temperature | .01925 |

Table I shows that our compound retains its plasticity very well upon aging.

To test the effectiveness of our compound in sealing actual cables, 3 neoprene jacketed cables were fitted in a 6-inch length of 4-inch diameter pipe with both ends of the cables protruding. Four plates, each with 3 holes drilled in them for the cables were inserted to seal the pipe with a layer of the compound of the example between two plates at one end of the pipe and another layer of compound between two plates at the other end of the pipe. The compound was cut to fit snugly to the cables but the holes in the plates were cut to have diameters 1/16, 1/8, and 1/4 inch greater than the cable diameters for the purpose of determining whether one size of plate aperture would accommodate a range of cable sizes. Each of the two pairs of plates was then pressed together by tightening nuts on threaded studs to a 10 in.-lb. torque thus extruding the compound to form seals around each of the three cables. The pipe was fitted with a pressure gage and filled through a threaded hole (later plugged) with compound that poured at 375° F. After conditioning overnight at room temperature the pipe assembly was placed in an oven at the following temperatures and times:

| | Hours |
|---|---|
| 70°–75° C. | 24 |
| 80°–85° C. | 4 |
| 90°–95° C. | 19 |
| 100° C. | 127 |
| 105° C. | 3 |

The assembly was then cycled 6 times, each cycle consisting of 8 hours at −18° C. and 16 hours at 100° C. During these tests the pressure varied from 0 to 30 p.s.i.g. but there was no evidence, whatever, of leakage of compound past the seals. In comparison it is known that conventional lead wool packings have leaked compound under conditions that were relatively much less severe.

We have invented a new and useful apparatus and compound for use therewith for which we desire an award of Letters Patent.

We claim:
1. An enclosure for a connection to an electric cable comprising:
(A) a chamber having an entrance for said cable,
(B) a first plate
  (a) in fluid-tight engagement with said chamber
  (b) sealing said entrance,
(C) a second plate in registration with said first plate,
(D) a cylindrical wall in said first plate defining an opening for said cable,
(E) a cylindrical wall in said second plate defining an opening for said cable,
  (a) said walls being in substantial registration thereby providing a passage for said cable into said chamber,
  (b) said cable extending through said passage into said chamber, and
  (c) said walls and said cable defining an annular space around said cable,
(F) a shoulder defining a first shallow recess in the surface of said first plate,
  (a) said recess facing said second plate and
  (b) surrounding said passage,
(G) a shoulder defining a second shallow recess in the surface of said second plate,
  (a) said second recess facing said first plate,
  (b) surrounding said passage, and
  (c) registering with said first recess,
(H) a sealing gasket
  (a) comprised of a flat shaeet of uncured elastomeric compound
  (b) between said plates
  (c) confined by said shoulders,
(I) means for pressing together said plates
  (a) and thereby inwardly extruding said compound to seal said annular space,
  (b) said compound extruding between said cable and the cylindrical walls in said plates, but
  (c) said compound not extruding appreciably beyond said shoulders so as to prevent the pressing together of said plates.

2. The enclosure of claim 1 wherein said compound is polychloroprene.

3. The enclosure of claim 1 wherein said enclosure is a pothead enclosing a fluid dielectric material.

4. The enclosure of claim 3 wherein said compound is polychloroprene.

References Cited in the file of this patent
UNITED STATES PATENTS

| | | |
|---|---|---|
| 1,045,389 | Gillmar et al. | Nov. 26, 1912 |
| 2,170,393 | Tornblom | Aug. 22, 1939 |
| 2,211,776 | Haury | Aug. 20, 1940 |
| 2,282,312 | Halstead | May 12, 1942 |
| 2,621,228 | Tompers | Dec. 9, 1952 |
| 2,700,140 | Phillips | Jan. 18, 1955 |
| 2,748,184 | Nicholas | May 29, 1956 |
| 2,788,385 | Doering et al. | Apr. 9, 1957 |

OTHER REFERENCES

"Coated Fabric Compounding, Rubber and Neoprene," Report No. 38–7, July 1938, E. I. du Pont de Nemours and Co. (Inc.), Rubber Chemical Division, page 8.

"Neoprene Compounding Principles, Part IV, Processing," E. I. du Pont de Nemours & Co., Report N–5, October 1, 1937.

Whitby: Synthetic Rubber, page 785, John Wiley and Sons, Inc., New York, 1954.

UNITED STATES PATENT OFFICE
CERTIFICATE OF CORRECTION

Patent No. 3,151,209                                            September 29, 1964

Ralph G. D'Ascoli et al.

It is hereby certified that error appears in the above numbered patent requiring correction and that the said Letters Patent should read as corrected below.

In the drawing, Fig. 6, screw 29 should extend to the top of the threaded hole; column 2, line 27, for "sections" read -- section --; column 3, line 29, after "gasket" insert -- 41 --; line 35, strike out "is", second occurrence; column 4, line 5, for "10-15" read -- 10-35 --; column 6, line 1, for "shaeet" read -- sheet --.

Signed and sealed this 2nd day of February 1965.

(SEAL)
Attest:

ERNEST W. SWIDER                                          EDWARD J. BRENNER
Attesting Officer                                              Commissioner of Patents